(12) United States Patent
Müller

(10) Patent No.: US 8,590,691 B2
(45) Date of Patent: Nov. 26, 2013

(54) LOGISTICS SYSTEM FOR A SHEET-PROCESSING MACHINE

(75) Inventor: Andreas Müller, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 4 days.

(21) Appl. No.: 13/052,419

(22) Filed: Mar. 21, 2011

(65) Prior Publication Data

US 2011/0226585 A1  Sep. 22, 2011

(30) Foreign Application Priority Data

Mar. 19, 2010  (DE) .......................... 10 2010 012 105

(51) Int. Cl.
  *B65G 47/53* (2006.01)
  *B65G 47/52* (2006.01)
(52) U.S. Cl.
  USPC .................. 198/370.01; 198/370.09; 198/809
(58) Field of Classification Search
  None
  See application file for complete search history.

(56) References Cited

U.S. PATENT DOCUMENTS

| | | | |
|---|---|---|---|
| 4,931,131 A * | 6/1990 | Thompson | 156/556 |
| 5,551,550 A * | 9/1996 | Marshall et al. | 198/432 |
| 6,347,540 B1 * | 2/2002 | De Biasi | 72/405.16 |
| 6,595,349 B2 * | 7/2003 | MacSwan | 198/607 |
| 7,987,969 B2 | 8/2011 | Detmers et al. | |
| 2004/0226803 A1 * | 11/2004 | Brixius et al. | 198/370.1 |

FOREIGN PATENT DOCUMENTS

| | | |
|---|---|---|
| DE | 1 808 023 | 5/1970 |
| DE | 201 291 | 7/1983 |
| DE | 76 22 026 U1 | 11/1984 |
| DE | 199 19 593 A1 | 8/2000 |
| DE | 201 07 827 U1 | 12/2001 |

OTHER PUBLICATIONS

German Patent and Trademark Office Search Report, Dated Jan. 19, 2011.

* cited by examiner

*Primary Examiner* — Kavel Singh
(74) *Attorney, Agent, or Firm* — Laurence A. Greenberg; Werner H. Stemer; Ralph E. Locher

(57) ABSTRACT

A logistics system for a sheet-processing machine, in particular a printing press, permits pallets and sheet stacks on transport boards to be displaced along transport paths. Storage spaces are provided for the intermediate storage of sheet stacks and a corner transfer device is provided for the transverse displacement of pallets and sheet stacks. The corner transfer device has two height-adjustable conveying devices disposed at right angles with respect to one another. The transport boards cover the transport path at ground level and the corner transfer device is configured in such a way that all of the transport boards are conveyed at a common height level, for example the height level of the machine hall floor.

9 Claims, 4 Drawing Sheets

LOGISTICS SYSTEM FOR A SHEET-PROCESSING MACHINE

CROSS-REFERENCE TO RELATED APPLICATION

This application claims the priority, under 35 U.S.C. §119, of German Patent Application DE 10 2010 012 105.3, filed Mar. 19, 2010; the prior application is herewith incorporated by reference in its entirety.

BACKGROUND OF THE INVENTION

Field of the Invention

The invention relates to a logistics system for a sheet-processing machine, in particular a printing press. Such a logistics system has storage regions from which pallets or sheet stacks are to be provided. Moreover, conveying paths and transverse slides (so-called corner transfer devices) are provided which can deflect a sheet stack in a direction that is offset by 90°.

A logistics system of that type is known, for example, from German Utility Model 20107827 U1. There, so-called transport pallets are transported on conveying paths which include roller tracks.

However, roller conveying systems have the disadvantage that they are not flexible in relation to the pallets to be used. Only certain system pallets with runners of strong configuration can be conveyed reliably. Moreover, they have a construction which lies above the level of a machine hall floor, as a result of which a transport truck, for example for delivering ink or varnish containers to the printing press, cannot travel over the runners.

SUMMARY OF THE INVENTION

It is accordingly an object of the invention to provide a logistics system for a sheet-processing machine, which overcomes the hereinafore-mentioned disadvantages of the heretofore-known systems of this general type and which can convey, transfer and store a multiplicity of pallets.

With the foregoing and other objects in view there is provided, in accordance with the invention, a logistics system for a sheet-processing machine. The logistics system comprises a transport path for pallets and sheet stacks. The transport path has storage spaces for intermediate storage of the pallets and sheet stacks and at least one corner transfer device for changing transport direction. The corner transfer device has two height-adjustable conveying devices disposed at right angles with respect to one another.

It is a particular advantage of the invention that transport boards can be used which are disposed at ground level and cover transport paths provided at ground level, as a result of which, for example, transport trucks, forklifts, etc. can travel over them without problems.

The transport boards can advantageously transport every type of pallet, for example wooden pallets as well.

The configuration of a corner transfer device in the region of one or more storage spaces or else in the region of an angularly disposed transport path course, is particularly advantageous. The corner transfer device is configured in such a way that the transport board is always conveyed on one plane.

A displaceable control guide plate, which can be actuated through the use of a single actuating element, is provided for adjusting the height of the transport belts of the corner transfer device from a waiting position into an operating position.

Other features which are considered as characteristic for the invention are set forth in the appended claims.

Although the invention is illustrated and described herein as embodied in a logistics system for a sheet-processing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
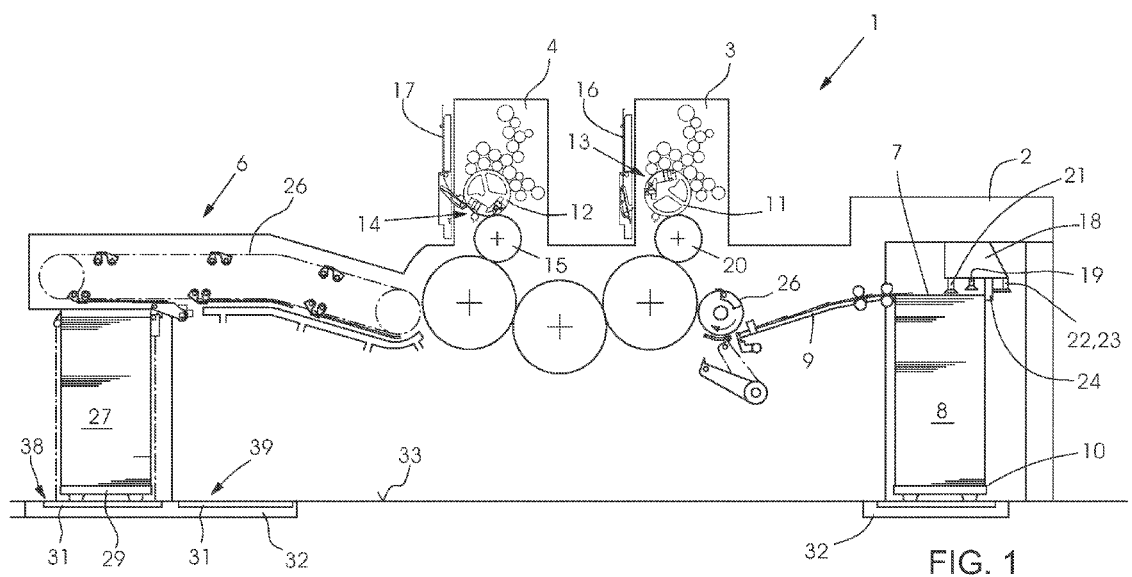
FIG. 1 is a diagrammatic, longitudinal-sectional view of a sheet-fed rotary printing press.

Referring now to the figures of the drawings in detail and first, particularly, to FIG. 1 thereof, there is seen a machine, for example a printing press 1, which processes sheets 7. The printing press 1 has a feeder 2, at least one printing unit 3 and 4 and a delivery 6. The sheets 7 are removed from a sheet stack 8 and are fed individually or in an overlapping manner to the printing units 3 and 4 over a feed table 9. The printing units 3 and 4 in each case contain a plate cylinder 11, 12 in a known way. The plate cylinders 11 and 12 in each case have an apparatus 13, 14 for fastening flexible printing plates. Moreover, each plate cylinder 11, 12 is assigned an apparatus 16, 17 for the semi-automatic or fully automatic changing of printing plates.

The sheet stack 8 rests on a stack board 10 which can be raised in a controlled way. The sheets 7 are removed from the upper side of the sheet stack 8 through the use of a so-called suction head 18 which has, inter alia, a number of lifting and dragging suckers 19, 21 for separating the sheets 7. Moreover, blowing devices 22 are provided for loosening the upper sheet layers and sensing elements 23 are provided for tracking the stack. A number of lateral and rear stops 24 are provided for aligning the sheet stack 8, in particular the upper sheets 7 of the sheet stack 8.

The printing press 1 has a chain gripper system 26 for delivering sheets to a delivery stack 27.

Figure 2:
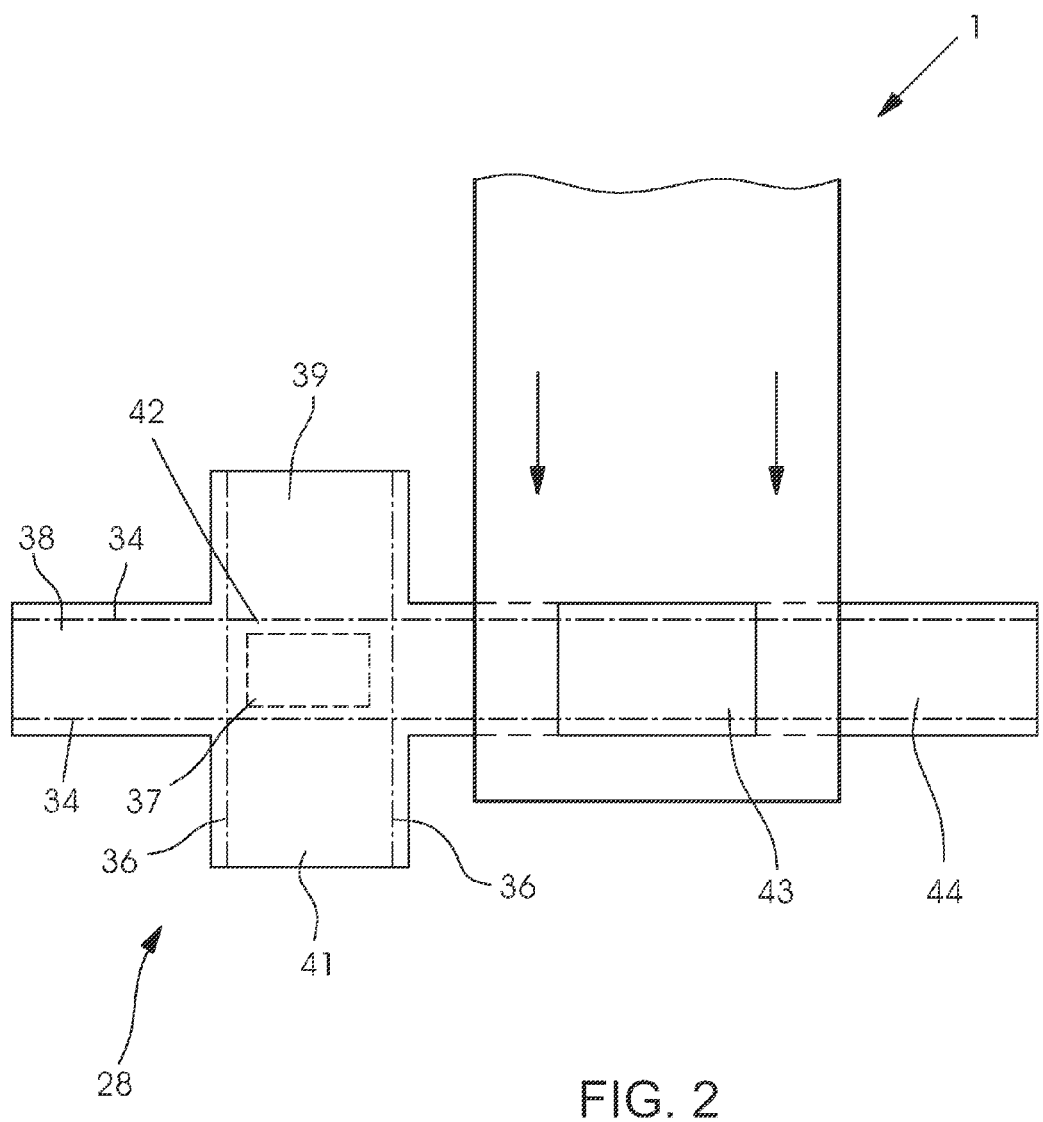
FIG. 2 is an enlarged, fragmentary, top-plan view of a delivery of the sheet-fed rotary printing press and a logistics system according to the invention.

FIG. 2 shows a plan view of the printing press 1 with a logistics system 28 for transporting pallets 29 and sheet stacks 27 on transport boards 31. The transport boards 31 are guided at ground level in transport paths 32 and are driven through the use of chain systems 34, 36, with the result that an upper side of the transport boards 31 has the same height level as the surface of a machine hall floor 33, on which the printing press 1 stands.

The first chain system 34 is disposed transversely with respect to the sheet transport direction of the printing press 1. The second chain system 36 is disposed at right angles to the first chain system 34 and crosses the latter in the region of a corner transfer or changeover device 37. The corner transfer or rerouting device 37 is configured for changing a transport direction of the transport boards 31. As a result of the configuration according to FIG. 2, it is possible to displace the transport boards 31 to different positions. Positions 38, 39, 41 are positions for storing and for depositing or removing empty pallets 29 or sheet stacks 27. The corner transfer device 37 is disposed at a position 42. Sheets of the sheet-processing machine 1 are received for forming a sheet stack 27 at a position 43. A position 44 serves as a waiting position for an empty pallet 29. It goes without saying that this can also be used for removing sheet stacks 27.

Depending on requirements, further storage positions can be provided and configured as desired through the use of further corner transfer devices 37. It goes without saying that the logistics system 28 can also have a transport path to the feeder 2 and to non-illustrated paper storage devices.

The delivery 6 is fitted with a new empty pallet 29 and sheet stacks 27 are stored at the removal positions 38, 39, 41 as follows in the logistics system 28 according to FIG. 2:

The position 38 of the logistics system 28 is fitted with an empty pallet 29 and is moved to the waiting position 44 through the use of the chain system 34. As soon as the sheet stack 27 has reached the predefined stack height, it is deposited on a transport board 31 of the logistics system 28 in the region of the position 43 and is moved to the position 38. Further sheet stacks 27 can be stored intermediately on the free storage spaces of the positions 39, 41 before they have to be removed by an operator.

Figure 3:
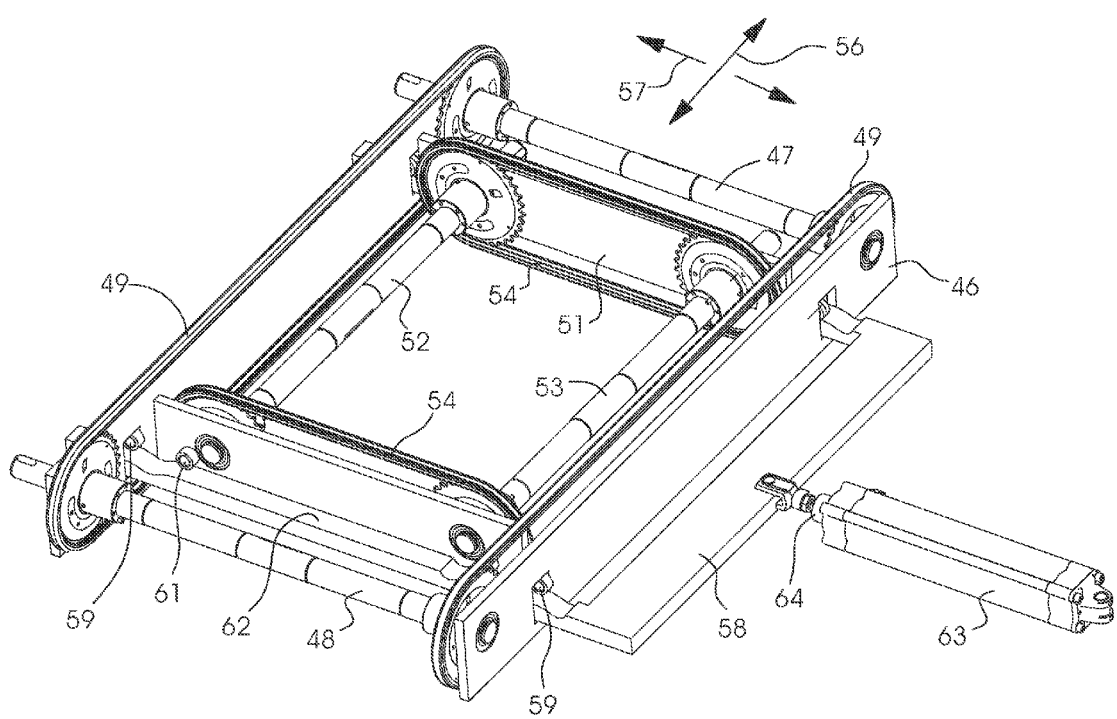
FIG. 3 is a perspective view of a corner transfer device.

As is seen in FIG. 3, the corner transfer device 37 has a first frame 46, in which a drive shaft 47 and a deflecting shaft 48 are mounted which drive two transport belts or chains 49 that are disposed in parallel and circulate endlessly.

A second frame 51 is disposed within an installation space of the first frame 46 and likewise has a drive shaft 52 mounted in the frame 51 and a deflecting shaft 53 which drive two transport belts or chains 54 that are disposed in parallel and circulate endlessly.

A drive direction 56 (arrow in FIG. 3) of the conveying device of the first frame 46 is disposed offset by 90° with respect to a drive direction 57 (arrow in FIG. 3) of the conveying device of the second frame 51.

The frames 46, 51 are mounted through the use of cam rollers 59, 61 on a displaceably disposed control element 58, for example a switching guide plate. The switching guide plate 58 is configured in the shape of a fork and reaches around the second frame 51 while it reaches through openings of the first frame 46.

The switching guide plate 58 has a control contour 62 which is in contact with the cam rollers 59 of the first frame 46 and the cam rollers 51 of the second frame. In order to adjust the height of the frames 46, 51, an operating cylinder 63, for example a pneumatic cylinder, which is disposed in a stationary manner, acts with a piston rod 64 on the switching guide plate 58, in order to displace the latter in or counter to the transport direction 57.

During displacement of the control guide plate 58, the contact of the cam rollers 59, 61 with the control contour 62 of the switching guide plate 58 causes the first frame 46 to rise up to a predetermined height level and the second frame 51 to drop to a level lying below the former in the waiting position and vice versa.

Figure 4:
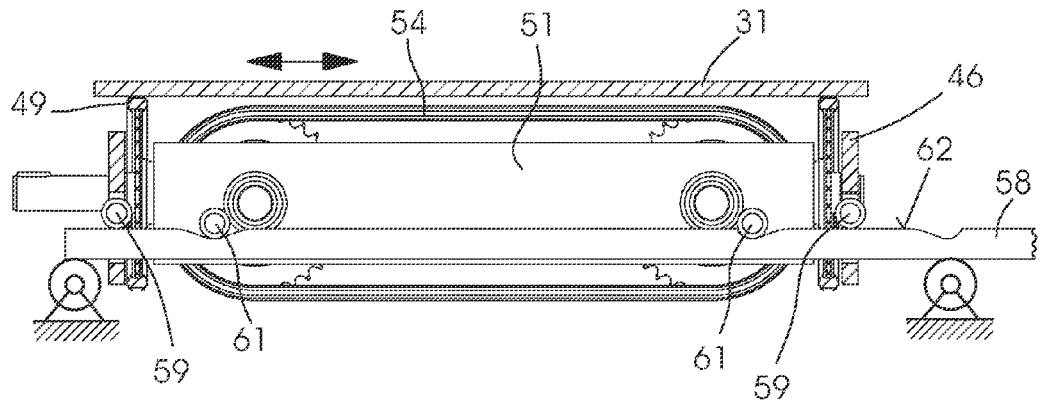
FIG. 4 is a cross-sectional view of the corner transfer device in a first operating position.
Figure 5:
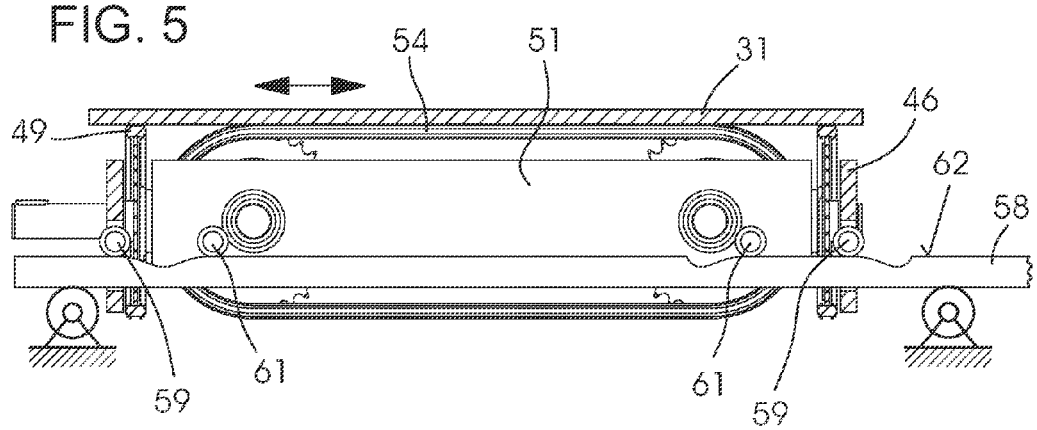
FIG. 5 is a cross-sectional view of the corner transfer device in a second operating position.

A transport board 31 which is conveyed through the use of the conveying device of the first frame 46 is stopped in the position 42 according to FIG. 4. Subsequently, the switching guide plate 58 is actuated, with the result that the conveying device of the second frame 51 is raised up to the height level of the conveying device of the first frame 46 according to FIG. 5.

Figure 6:
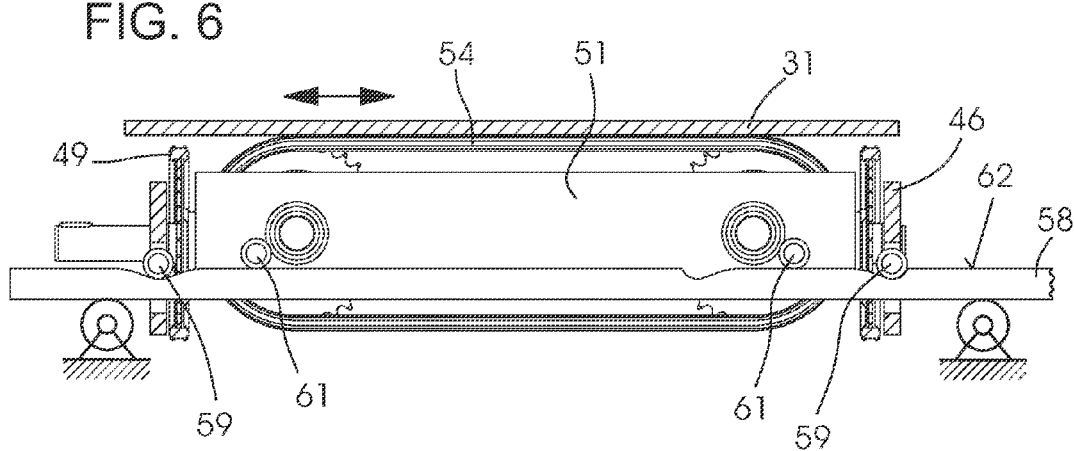
FIG. 6 is a cross-sectional view of the corner transfer device in a third operating position.

The first frame 46, according to FIG. 6, is lowered by further actuation of the switching guide plate 58. The transport board 31 is displaced to the position 39 or optionally 41 by starting of the conveying device of the second frame 51.

The invention claimed is:

1. A logistics system for a sheet-processing machine, the logistics system comprising:
    a transport path for pallets and sheet stacks;
    said transport path having storage spaces for intermediate storage of the pallets and sheet stacks and at least one corner transfer device for changing transport direction; and
    said corner transfer device having two height-adjustable conveying devices disposed at right angles with respect to one another;
    frames in each of which a respective one of said conveying devices is mounted, said frames being height adjustable with respect to one another for establishing a height of the conveying devices; and
    an adjusting device controlling a height of said frames with respect to one another for simultaneously alternating the height of said conveying devices between a common transporting height and a lowered waiting position height.

2. The logistics system according to claim 1, which further comprises displaceable transport boards covering said transport paths at ground level being a level of a machine hall floor.

3. The logistics system according to claim 2, which further comprises chain systems for displacing said transport boards.

4. The logistics system according to claim 1, wherein said conveying devices each include respective mutually parallel, endlessly circulating and drivable chains or transport belts.

5. The logistics system according to claim 1, which further comprises said adjusting device having a control element connected to said frames.

6. The logistics system according to claim 5, wherein said control element is configured as a switching guide plate being mounted for horizontal displacement and having a control contour.

7. The logistics system according to claim 6, which further comprises:
    stops disposed on said frames;
    said control contour of said switching guide plate interacting with said stops.

8. The logistics system according to claim 7, wherein said stops are configured as rotatably mounted cam rollers.

9. The logistics system according to claim 8, which further comprises a single stationary operating cylinder for producing said horizontal displacement of said control element.

\* \* \* \* \*